United States Patent
Kishie et al.

(10) Patent No.: US 8,643,966 B2
(45) Date of Patent: Feb. 4, 2014

(54) INSPECTION DEVICE OR INSPECTION METHOD FOR MAGNETIC HEAD OR MAGNETIC DISC, AND MAGNETIC DISC RECORDING DEVICE AND MAGNETIC DISC RECORDING METHOD

(75) Inventors: Kazuhiko Kishie, Kamisato (JP); Kunihito Higa, Kamisato (JP); Yoshihiro Sakurai, Kamisato (JP)

(73) Assignee: Hitachi High-Technologies Corporation, Tokyo (JP)

( * ) Notice: Subject to any disclaimer, the term of this patent is extended or adjusted under 35 U.S.C. 154(b) by 237 days.

(21) Appl. No.: 13/207,510

(22) Filed: Aug. 11, 2011

(65) Prior Publication Data
US 2012/0057255 A1    Mar. 8, 2012

(30) Foreign Application Priority Data
Aug. 20, 2010 (JP) ................................. 2010-184877

(51) Int. Cl.
*G11B 27/36* (2006.01)
(52) U.S. Cl.
USPC .......................................................... 360/31
(58) Field of Classification Search
None
See application file for complete search history.

(56) References Cited

U.S. PATENT DOCUMENTS

| | | | |
|---|---|---|---|
| 4,979,051 A * | 12/1990 | Eggebeen ........................ 360/21 |
| 5,229,895 A * | 7/1993 | Schwarz et al. ........... 360/77.12 |
| 5,898,533 A * | 4/1999 | Mantey et al. .................. 360/48 |
| 6,034,835 A * | 3/2000 | Serrano ...................... 360/77.05 |
| 6,961,200 B2 * | 11/2005 | Lee et al. ..................... 360/72.1 |
| 2004/0141252 A1 * | 7/2004 | Zayas .............................. 360/75 |
| 2012/0057255 A1 * | 3/2012 | Kishie et al. .................... 360/31 |

FOREIGN PATENT DOCUMENTS

JP    10-011926    1/1998

OTHER PUBLICATIONS

Machine translation of Saito et al., JP 10-011926, published Jan. 16, 1998.*

* cited by examiner

*Primary Examiner* — Peter Vincent Agustin
(74) *Attorney, Agent, or Firm* — Antonelli, Terry, Stout & Kraus, LLP.

(57) ABSTRACT

An inspection device or inspection method for a magnetic head or magnetic disc which can form a servo pattern applicable to a write system, and a magnetic disc recording device or magnetic disc recording method. In inspection or recording of a magnetic disc, which rotates the magnetic disc, a servo pattern is written into a servo pattern region of the magnetic disc by a write-in element of a magnetic head, and is read by a read-in element of the magnetic head. Servo following of a position of the magnetic head on the magnetic disc is performed based on the servo pattern which comprises a plurality of patterns. The patterns are written-in with a first frequency for causing the patterns to be subjected to the servo following and, the patterns are overwritten with a second frequency different from the first frequency, except a servo following width used in the servo following.

11 Claims, 7 Drawing Sheets

INSPECTION DEVICE OR INSPECTION METHOD FOR MAGNETIC HEAD OR MAGNETIC DISC, AND MAGNETIC DISC RECORDING DEVICE AND MAGNETIC DISC RECORDING METHOD

BACKGROUND OF THE INVENTION

The present invention relates to an inspection device or inspection method for a magnetic head or magnetic disc, and a magnetic disc recording device and magnetic disc recording method and, more particularly, to an inspection device or inspection method for a magnetic head or magnetic disc which is of a shingle write system capable of increasing a memory capacity, and a magnetic disc recording device and magnetic disc recording method.

Recently, according to sudden increase of an information volume, demand is raised for increasing the record capacity of a recording device. In a magnetic recording device, such demand is also raised. As a method for increasing the record capacity of the magnetic recording device, there is a shingle write system. According to development of a shingle write/magnetic recording device, it is necessary to also develop an inspection device for a magnetic head or magnetic disc which is used in the magnetic recording device.

As a conventional system which is not a shingle write system, there is a system disclosed in Patent Literature 1 (Japanese Patent Application Laid-open Publication No. H10-11926).

SUMMARY OF THE INVENTION

However, it is the fact that the write system itself has been proposed but is not put to practical use because such a conventional data write-in system as to be merely described in the Japanese Patent Application Laid-open Publication No. H10-11926 cannot be applied.

Figure 1A:
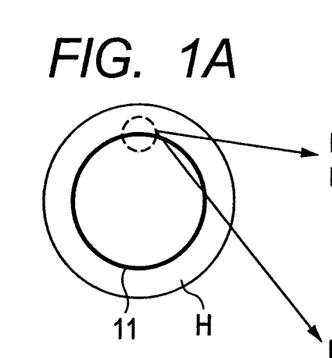
FIG. 1A is a view which explains the concept of a shingle write system and illustrates a write-in track written in a circumferential shape on a magnetic disc.
Figure 1B:
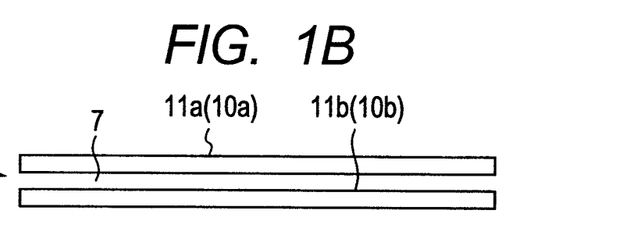
FIG. 1B is a view illustrating write-in tracks in a conventional system.
Figure 1C:
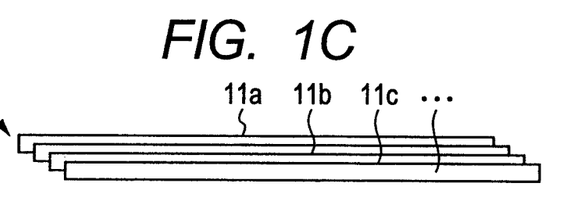
FIG. 1C is a view illustrating write-in tracks in the shingle write system.

FIG. 1A is a view explaining the concept of the shingle write system. As shown in FIG. 1B, the conventional data write-in system is a system in which a write-in track 11a that is written-in in a circumferential shape by a magnetic head and shown in FIG. 1A is written-in so as to leave a space 7 between it and an adjacent write-in track 11b. The write-in tracks 11a, 11b become data tracks 10a, 10b whose data are read and written, as they are. On the other hand, the shingle write system is a system in which, as shown in FIG. 1C, a write-in track 11b adjacent to a certain write-in track 11a is overwritten on the write-in track 11a by about one-half or one-third of a write-in track width (the overwriting rate is arbitrary) and, moreover, an adjacent write-in track 11c is overwritten at the same rate, and track writing is in turn carried out in such a manner to overwrite write-in tracks like shingle on the roof of a house, and the write-in tracks 11a, 11b, 11c . . . do not become the data tracks 10.

In the following explanation, reference designators of the magnetic head and of a read-in element and a write-in element which are provided at the magnetic head will be referred to. Basically, a conventional write-in element is also used in the shingle write system, so that it is denoted by W. On the other hand, regarding the magnetic head and the read-in element provided at the magnetic head, the conventional magnetic head and the conventional read-in element are denoted by OH and OR, respectively, the magnetic head and the read-in element which are used in the shingle write system are designated by KH and KR, respectively, and the magnetic head and the read-in element which are used both in the conventional system and the shingle write system are designated by H and R, respectively.

Figure 2A:
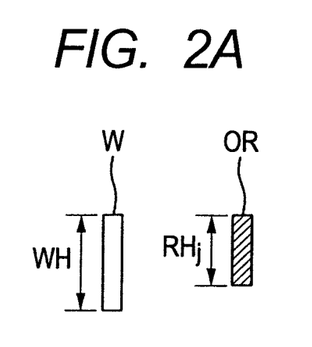
FIG. 2A is a view illustrating a relationship between the write-in width and the read-in width of a magnetic head in the conventional system.
Figure 2B:
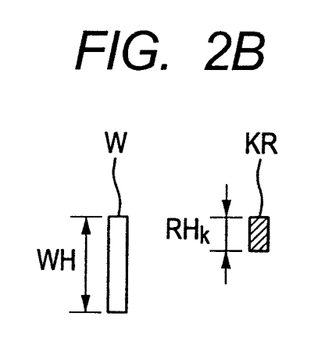
FIG. 2B is a view illustrating a relationship between the write-in width and the read-in width of a magnetic head in the shingle write system.

A point in which the shingle write system is greatly different from the conventional system resides in the width RH of the read-in element R of the magnetic head. The write-in element W of the magnetic head requires power for writing-in, so that it is impossible to narrow its width WH. The width RHj of the read-in element OR of the conventional magnetic head is the same as the width WH of the write-in element W of the magnetic head, or is slightly narrower than that of the write-in element, for example, about 80-90% of that of the write-in element as shown in FIG. 2A. On the other hand, as shown in FIG. 2B, the read-in element width RHk of the magnetic head in the shingle write system is considerably narrowed relative to the width WH of the write-in element, for example, about 20-50% of the width WH of the write-in element, in order to increase a record capacity. This is because a data track width that is specified in the shingle write system requires that, for example, a data written on the read-in element width RHk is read-in by the read-in element KR. If the read-in width becomes narrower and unless trace is performed while correctly grasping the center of a data track intended to be a target at the time of read-in processing, it is impossible to read-in a correct data.

Therefore, a first object of the present invention is to provide an inspection device or inspection method for a magnetic head or magnetic disc which can form a servo pattern applicable to in a shingle write system.

Moreover, a second object of the present invention is to provide a magnetic disc recording device or magnetic disc recording method which can form a servo pattern applicable to in a write system.

In order to achieve the above-mentioned objects, the present invention has at least the following aspects.

In order to achieve the first object, a first aspect of the present invention inheres in a magnetic disc inspection device or method for measuring a property of a magnetic head or magnetic disc, which rotates the magnetic disc, writes a servo pattern into a servo pattern region of the magnetic disc by a write-in element of the magnetic head, reads-in the servo pattern written in the servo pattern region of the magnetic disc, by a read-in element of the magnetic disc, performs servo following of a position of the magnetic head on the magnetic disc on the basis of the servo pattern, wherein the servo pattern comprises a plurality of patterns, the patterns are written-in with a first frequency for causing the patterns to be subjected to the servo following and, thereafter, the patterns are overwritten with a second frequency different from the first frequency, except a servo following width used in the servo following.

Moreover, in order to achieve the first object, a second aspect of the present invention inheres in formation of the plurality of patterns with deviation at predetermined intervals in radial and circumferential directions of the magnetic disc.

Moreover, in order to achieve the first object, a third aspect of the present invention inheres in writing-in of the first frequency on a position of an arbitrary pattern of the plurality of patterns and writing-in of the second frequency on a position of a different pattern, during the same one cycle of rotation of the rotation.

Moreover, in order to achieve the first object, a fourth aspect of the present invention inheres in writing of the first frequency into a position of a pattern subsequent to the arbitrary pattern and writing of the second frequency into a position of a pattern subsequent to the different pattern, during one cycle of rotation subsequent to the one cycle of rotation.

Moreover, in order to achieve the first object, a fifth aspect of the present invention inheres in the servo following width that is wider than the read-in element width and is not more than 120% of the read-in element width.

Moreover, in order to achieve the first object, a sixth aspect of the present invention inheres in the width of the read-in element that is a width in a range of 20%-50% of the width of the write-in element.

Moreover, in order to achieve the second object, a seventh aspect of the present invention inheres in a magnetic disc recording device or method which rotates the magnetic disc, writes a servo pattern into a servo pattern region of the magnetic disc by a write-in element of a magnetic head, reads-in the servo pattern written into the servo pattern region of the magnetic disc, by a read-in element of the magnetic head, performs servo following of a position of the magnetic head on the magnetic disc based on the servo pattern, and read-in the data, wherein the servo pattern comprises a plurality of patterns, the patterns are written-in with a first frequency for causing the patterns to be subjected to the servo following and, thereafter, the patterns are overwritten with a second frequency different from the first frequency, except a servo following width used in the servo following.

According to the present invention, there is provided an inspection device or inspection method for a magnetic head or magnetic disc which can form a servo pattern applicable to in a shingle write system.

Moreover, according to the present invention, there is provided a magnetic disc recording device or method which can form a servo pattern applicable to in a shingle write system.

DESCRIPTION OF THE PREFERRED EMBODIMENTS

Figure 3:
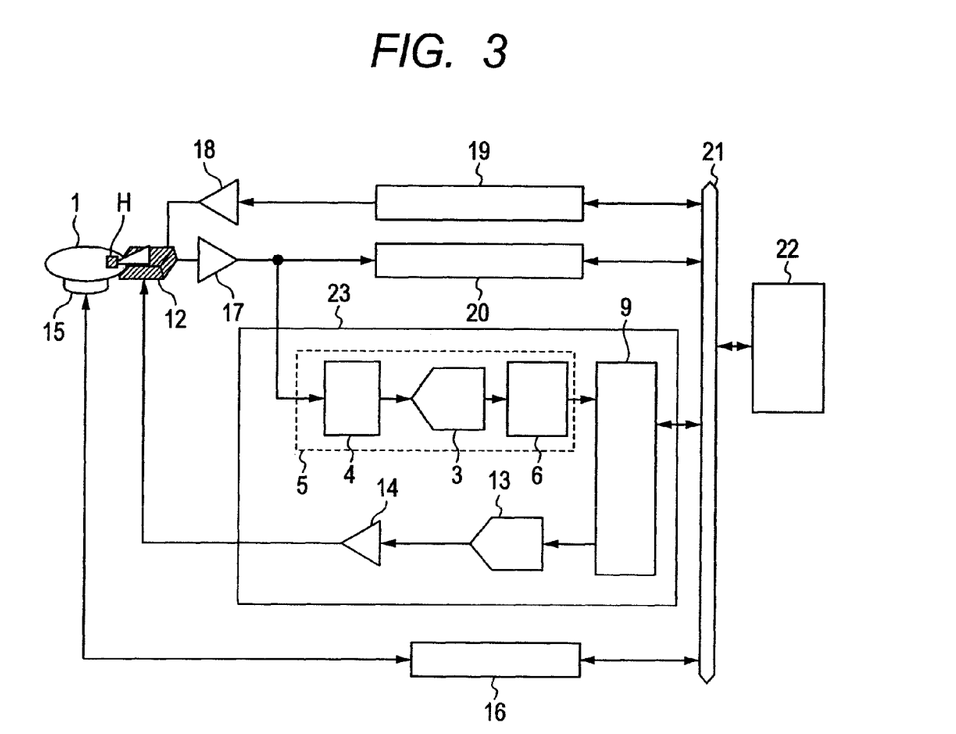
FIG. 3 is a view illustrating a system block diagram of a magnetic head inspection device or magnetic disc inspection device according to an embodiment of the present invention.

FIG. 3 is a system block diagram of a magnetic head inspection device or magnetic disc inspection device according to an embodiment of the present invention. In the inspection device, a disc rotation section 15 holds a magnetic disc 1 and rotates to cause a magnetic head H to operatively rise up over the disc. A test data which is produced according to the output of a write-in signal generation section 19 is recorded, via a write-in amplifier 18, on a write-in track 11 (refer to FIG. 1) which is intended to be a target in the magnetic disc 1. Then, the recorded test data is read-in by the magnetic head H, amplified by a read-in amplifier 17 and inputted as a reproduction signal to a property measuring section 20 and a servo control section 5. The property measuring section 20 measures electric properties such as the S/N of the reproduction signal, etc. and outputs, via a tester bus 21, them to a total control section 22 of the inspection device which performs the quality judgment and classification of the magnetic head or magnetic disc, which is a target to be tested, on the basis of the output data.

Figure 4A:
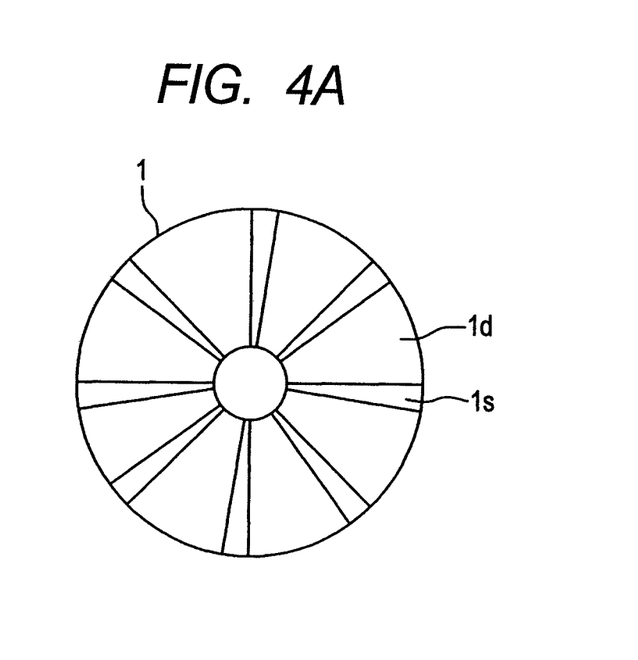
FIG. 4A is a view illustrating the region-configuration of a magnetic disc.

In order to perform a servo control for positioning the magnetic head H on a target test track 10 (refer to FIG. 1) in advance before the commencement of inspection, a servo pattern which is a servo signal is written on a servo pattern region 1s on the magnetic disc 1 which is shown in FIG. 4A. A servo control section 23 performs a position control, which is a so-called servo following, for positioning the magnetic head H on the center or arbitrary position of the target data track, on the basis of the signal of the servo pattern. Concretely, the signal of the servo pattern is first inputted to a servo pattern detection section 5 in the servo control section 23. A low pulse filter 4 eliminates frequency components (noise) except the signal component fu of the servo pattern and outputs the signal to an A/D convertor 3. A frequency analyzer 6 receives the signal from the A/D convertor 3 and calculates and inputs amplitude data of respective patterns forming the servo pattern to a head position detection/control section 9.

The head position detection/control section 9 collects the amplitude data of the respective patterns of the servo pattern, detects the position of the magnetic head H based on the amplitude data, and outputs a position signal for correcting a deviation between the detected position and a target position to a stage 12 through a D/A convertor 13 and an output amplifier 14. By repeating this operation, it is possible to perform the positioning of the magnetic head H with high precision.

Next, a servo following technology for correctly grasping and tracing the center of the data track will be explained in detail with reference to FIG. 4. FIG. 4 is a view showing the basic concept of the servo following.

As shown in FIG. 4A, the magnetic disc 1 is divided into an arbitrary number of blocks (8/16/32/64/128 divisions) equally spaced apart from one another in a circumferential direction, and includes a servo region 1s provided at one end side of each block for forming a servo pattern 2, and data regions 1d which are other regions and on which data are formed.

Figure 4B:
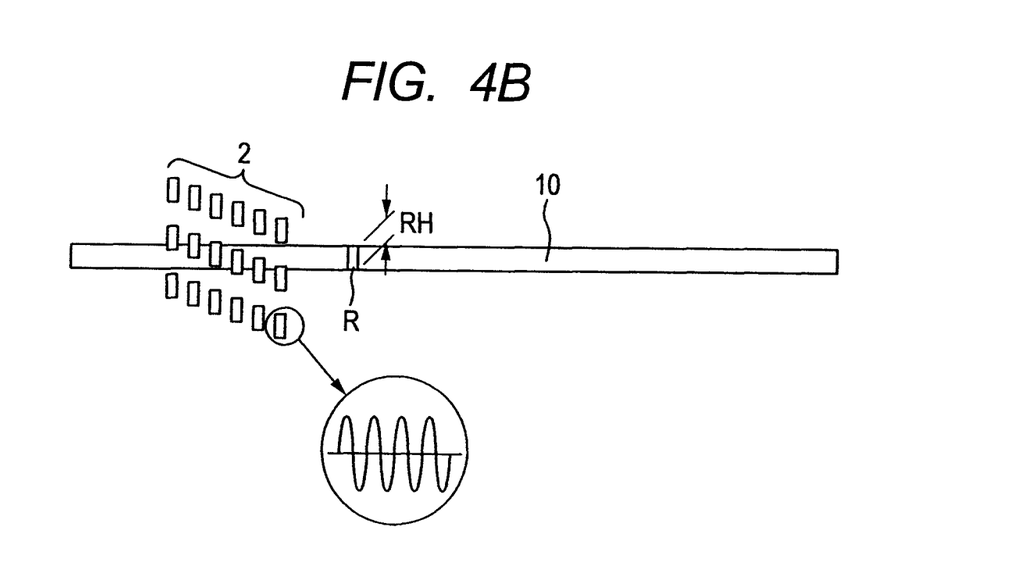
FIG. 4B is a view illustrating the basic concept of servo following.

The servo following is a system which causes the read-in element R to be always retained on the data track by self-formingly writing the servo pattern 2 with the write-in element of the magnetic head as described above, reading the servo pattern 2, shown in FIG. 4B, by the read-in element R of the magnetic head, calculating the deviation of the magnetic disc 1 in a radial direction and performing a position correction, according to the shape of a waveform outputted. Therefore, as shown in FIG. 4B, the servo pattern is written as a plurality of patterns (six patterns in FIG. 4B) which are vertical relative to the data track 10 and deviated in radial and circumferential directions at a predetermined interval, difference of read-in output values occur, and the position is corrected according to its output waveforms. While the respective patterns are represented in a rectangle shape in FIG. 4B, really a waveform of a sine frequency which can be read-in by the read-in element R is written-in as shown in an extract diagram.

Figure 5A:
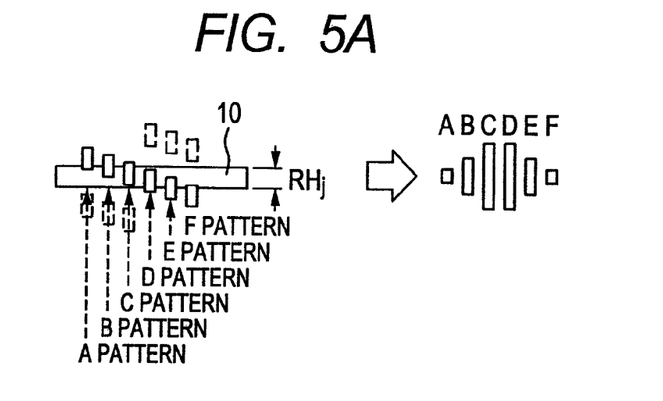
FIG. 5A is a view illustrating a case where a servo pattern written with the conventional system is read-in by the read-in element of the conventional system and subjected to the servo following, and a case where the read-in element passes through the center of a data track specified by the read-in element and is scarcely required to be subjected to position correction.
Figure 5B:
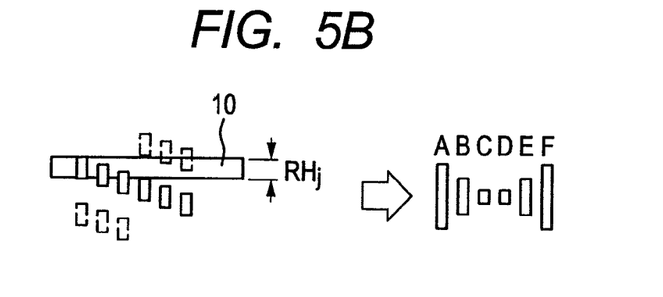
FIG. 5B is a view illustrating the case where the servo pattern written with the conventional system is read-in by the read-in element of the conventional system and subjected to the servo following, and a case where the read-in element passes through a position deviated from the center of the data track specified by the read-in element and is considerably required to be subjected to the position correction.

FIGS. 5A and 5B are views illustrating a case where the servo pattern written with the conventional system is read-in by the conventional read-in element OR and subjected to the servo following. Moreover, FIGS. 5A and 5B are views showing a relationship between the servo pattern 2 and the locus of the read-in element OR when the servo pattern, composed of six patterns A to F, which is written by the conventional system is read-in by the conventional read-in element OR, and output value patterns read-in at that time. The output values are represented by amplitude values of the respective patterns read-in. FIG. 5A is a view illustrating a case where the read-in element OR passes through the center of the data track 10 specified by the read-in element OR and is scarcely required to be subjected to position correction, and FIG. 5B is a view illustrating a case where the read-in element OR passes through a position deviated from the center of the data track specified by the read-in element OR and is considerably required to be subjected to the position correction. In the case shown in FIG. 5A, the output values of center C and D patterns exhibit patterns of large rhomb-shapes and, in the case shown in FIG. 5B, conversely the output values of A and F patterns exhibit patterns of large inverted rhomb-shapes. According to such differences of the patterns, the position correction is performed.

Figure 6A:
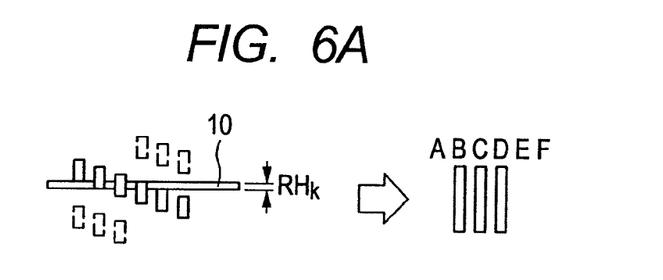
FIGS. 6A and 6B are views illustrating a case where the servo pattern written with the conventional system is subjected to the servo following with a read-in element KR of the shingle write system, and correspond to FIG. 5A and FIG. 5B, respectively.
Figure 6B:
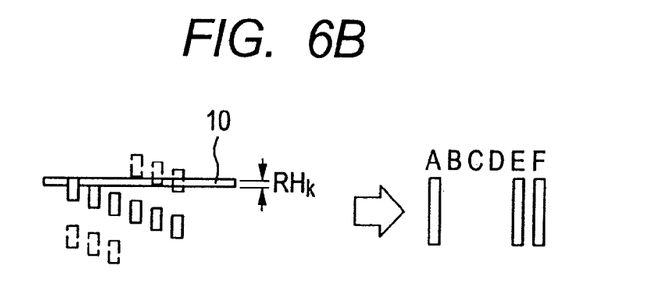

FIGS. 6A and 6B are views illustrating a case where the servo pattern written by the conventional system is subjected to the servo following by the read-in element KR of the shingle write system. FIG. 6A and FIG. 6B are a view and a view which correspond to FIG. 5A and FIG. 5B, respectively. In both a case where the read-in element KR shown in FIG. 6A is located on the center of the data track 10 specified by the read-in element KR, and a case where the read-in element KR shown in FIG. 6B is separated from the center of the data track 10 specified by the read-in element KR, readable patterns and unreadable patterns are generated. The patterns which can be read become maximum outputs. The patterns which cannot be read become outputs of zero, output differences among the patterns are not produced, and it is impossible to calculate how degree of deviation of the read-in element from the center of the data track occurs.

Thus, the problem raised when the servo pattern written with the conventional system is read by the shingle write head is due to a great difference between the write-in width WH of the servo pattern and the width RHk of the shingle write/write-in element KR. While the extreme case is shown in FIGS. 6A and 6B, it is as follows when it is more explained. The servo pattern 2 written with the width of the write-in element W is twice to quadruple as wide as the width of the read-in element KR, so that in a case where, even if the position of the read-in element KR is deviated relative to the data track, the deviation amount is small, the change of a waveform of the servo pattern is hard to occur. Conversely, in a case where the deviation amount becomes large, the differences of the respective patterns do not appear, and it is impossible to recognize how degree it is deviated relative to the data track and distinguish whether they are deviated in the inner radial direction or in the outer radial direction.

Therefore, it becomes necessary to prepare a servo pattern suitable for the shingle write head. From the above consideration, in order to cause even a narrow width magnetic head KH for shingle write to carry out the servo following in the same manner as in the conventional system, the width of the servo pattern to be read-in by the shingle writ/read-in element KR is required to be written-in with a width TH suitable for a read-in element width RW (hereinafter merely referred to as a read-in suitable-width TH). The write-in suitable-width means a width that is the same as the read-in width RW or is about the read-in width+20%.

Figure 7:
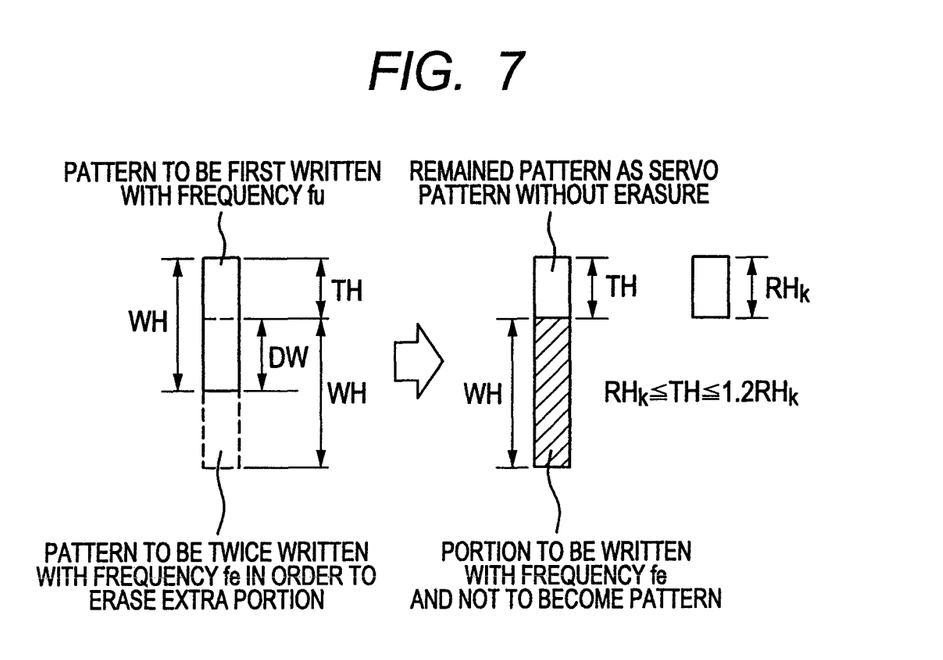
FIG. 7 is a view illustrating a basic concept of the embodiment of the present invention for forming a read-in suitable-width.

FIG. 7 illustrates the idea of forming the read-in suitable-width TH according to the embodiment. First of all, as shown in FIG. 7, after write-in is performed with the write-in element width WH with a frequency fu (a first frequency) that forms the servo pattern to be subjected to the servo following, write-in is performed with another frequency fe (a second frequency), overwriting is carried out by a difference DW between the write-in element width WH and the read-in suitable-width TH and erasing is carried out. For example, another frequency fe means a frequency which is cut by the low pulse filter 4 shown in FIG. 3 or to which the read-in element KR does not respond. Thereby, among the patterns previously written, widths of unoverlapped regions become same as the read-in suitable-width TH. If all the servo patterns are written-in, by this method, with a width that is the same as the read-in suitable-width TH, even in the shingle write head, output differences among the patterns occur in the same manner as the conventional system and the position correction is made possible by calculating the positional deviation amount from the differences.

Figure 8:
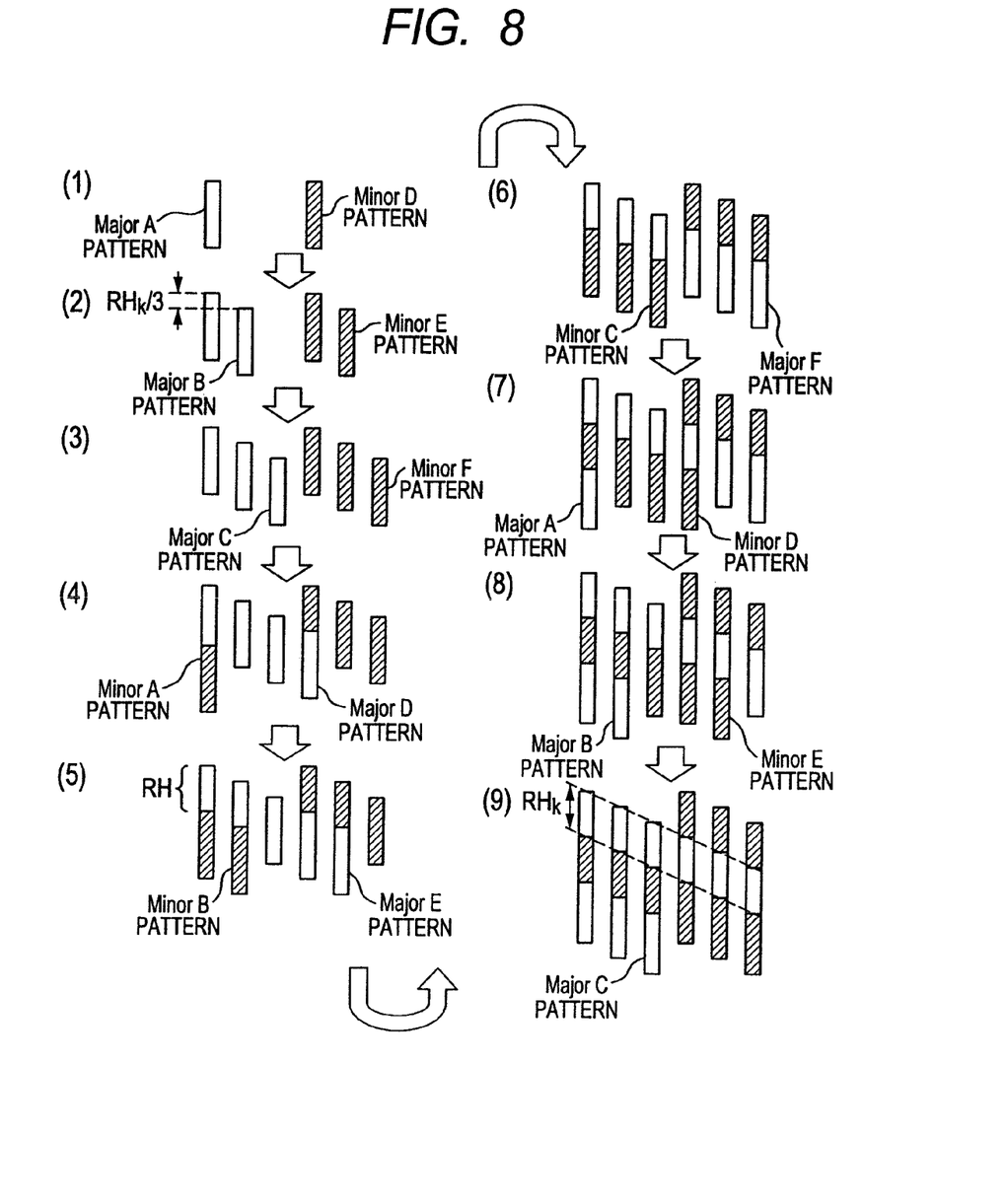
FIG. 8 is a view illustrating a write-in procedure of the servo pattern which corresponds to overwriting.

FIG. 8 illustrates a procedure for writing-in a servo pattern, which corresponds to the above-mentioned overwriting. In FIG. 8, the read-in suitable-width TH is made a read-in width RHk of the shingle write/read-in element KR. In order to facilitate distinguishment when explanation is given, the write-in which the shingle write/read-in element KR carries out with the frequency fu in order to form the pattern for the servo following is referred to as Major write-in and the write-in which is performed with another frequency fe in order to erase the pattern which is not required to be overwritten in the Major write-in is referred to as Minor write-in. Moreover, a case where a set of six patterns is prepare as the servo pattern is exemplified, and the patterns are referred to as from A pattern to F pattern in position orders thereof. Moreover, in the following explanation, for example, the writing of the A pattern is referred to as writing of a specified pattern by the write-in element W with the frequency fu or the frequency fe on a position at which the A pattern shall be present. The specified pattern is the same relative to the respective patterns including from the A pattern to the F pattern. Moreover, the radial direction is referred to as a radial direction of the magnetic disc 1.

(Process 1) The A pattern is written by the Major write-in and D pattern is written at the same height as the A pattern in the radial direction by the Minor write-in.

(Process 2) B pattern is written by the Major write-in after one cycle of rotation of the magnetic disc 1 and E pattern is written at the same height as the B pattern in the radial direction by the Minor write-in. The Major B pattern at this time is deviated in the radial direction by ⅓ of the read-in element width relative to the Major pattern A written in the process 1, according to the one cycle of rotation. Like the Major B pattern, the Minor E pattern is deviated in the radial direction by ⅓ of the read-in element width relative to the Minor D pattern written in the process 1.

(Process 3) Moreover, C pattern is written by the Major write-in after the one cycle of rotation of the magnetic disc 1 and F pattern is written at the same height as the C pattern in the radial direction by the Minor write-in. The Major C pattern at this time is deviated in the radial direction by ⅓ of the read-in element width relative to the Major B pattern written in the process 2, according to the one cycle of rotation. Moreover, like the Major C pattern, the Minor F pattern is deviated in the radial direction by ⅓ of the read-in element width relative to the Minor E pattern written in the process 2.

(Process 4) The D pattern is written by the Major write-in after the one cycle of rotation of the magnetic disc 1 and the A pattern is written at the same height as the D pattern in the radial direction by the Minor write-in. The Major D pattern at this time is deviated in the radial direction by ⅓ of the read-in element width relative to the Minor C pattern written in the process 3, according to the one cycle of rotation of the magnetic disc 1. Moreover, like the Major D pattern, the Minor A pattern is deviated in the radial direction by ⅓ of the read-in element width relative to the Minor F pattern written in the process 3. The Major A pattern written in the process 1 is overwritten with the Minor A pattern and a remaining part becomes equal to the read-in element width.

(Process 5) The E pattern is written by the Major write-in after one cycle of rotation of the magnetic disc 1 and the B pattern is written at the same height as the E pattern in the radial direction by the Minor write-in. The Major E pattern at this time is deviated in the radial direction by ⅓ of the read-in element width relative to the Major D pattern written in the process 4, according to the one cycle of rotation. Moreover, like the Major E pattern, the Minor B pattern is deviated in the radial direction by ⅓ of the read-in element width relative to the Minor A pattern written in the process 4. The Major B pattern written in the process 2 is overwritten with the Minor B pattern and a remaining part becomes equal to the read-in element width.

(Process 6) The F pattern is written by the Major write-in after one cycle of rotation of the magnetic disc 1 and the C pattern is written at the same height as the F pattern in the radial direction by the Minor write-in. The Major F pattern at this time is deviated in the radial direction by ⅓ of the read-in element width relative to the Major E pattern written in the process 5, according to the one cycle of rotation of the magnetic disc 1. Moreover, like the Major F pattern, the Minor C pattern is deviated in the radial direction by ⅓ of the read-in element width relative to the Minor B pattern written in the process 5. The Major C pattern written in the process 3 is overwritten with the Minor C pattern and a remaining part becomes equal to the read-in element width.

(Process 7) The A pattern is written by the Major write-in after the one cycle of rotation of the magnetic disc 1 and the D pattern is written at the same height as the A pattern in the radial direction by the Minor write-in. The Major A pattern at this time is deviated in the radial direction by ⅓ of the read-in element width relative to the Major F pattern written in process 6, according to the one cycle of rotation. Moreover, like the Major A pattern, the Minor D pattern is deviated in the radial direction by ⅓ of the read-in element width relative to the Minor C pattern written in the process 6. The Major D pattern written in the process 4 is overwritten with the Minor D pattern and a remaining part becomes equal to the read-in element width.

(Process 8) The B pattern is written by the Major write-in after the one cycle of rotation of the magnetic disc 1 and the E pattern is written at the same height as the B pattern in the radial direction by the Minor write-in. The Major B pattern at this time is deviated in the radial direction by ⅓ of the read-in element width relative to the Major A pattern written in the process 7, according to the one cycle of rotation. Moreover, like the Major B pattern, the Minor E pattern is deviated in the radial direction by ⅓ of the read-in element width relative to the Minor D pattern written in the process 7. The Major E pattern written in the process 5 is overwritten with the Minor E pattern and a remaining part becomes equal to the read-in element width.

(Process 9) The C pattern is written by the Major write-in after the one cycle of rotation of the magnetic disc 1 and the F pattern is written at the same height as the C pattern in the radial direction by the Minor write-in. The Major C pattern at this time is deviated in the radial direction by ⅓ of the read-in element width relative to the Major B pattern written in the process 8, according to the one cycle of rotation. Moreover, like the Major C pattern, the Minor F pattern is deviated in the radial direction by ⅓ of the read-in element width relative to the Minor E patter written in the process 8. The Major F pattern written in the process 6 is overwritten with the Minor F pattern and a remaining part becomes equal to the read-in element width.

Figure 9:
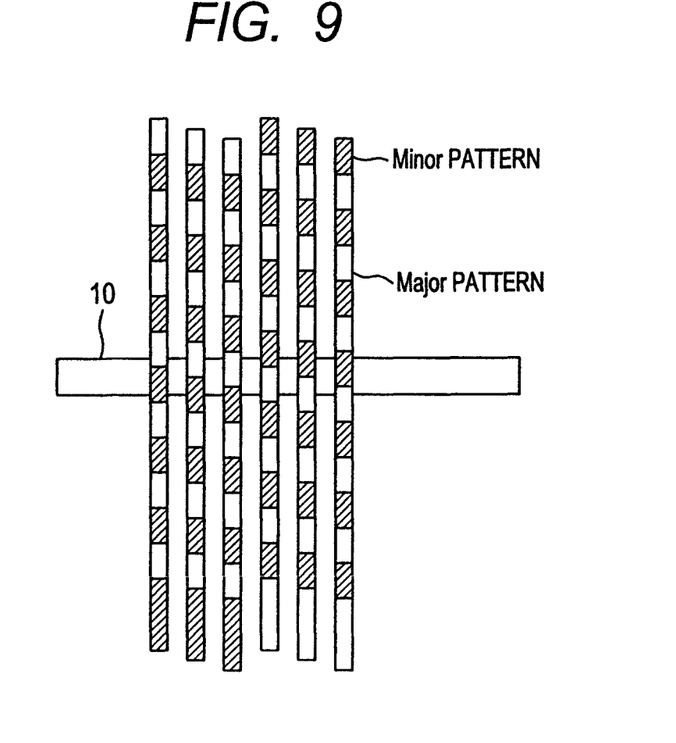
FIG. 9 is a view illustrating a servo pattern in the shingle write system according to the embodiment of the present invention.

Thus, as indicated by broken lines, the one set of the Major patterns A-F written in the processes 1-9 has been overwritten with the same width as the read-in element width. Thereafter, every time when the processes 4-9 are repeated, a set of six servo patterns is added, and servo patterns which are shown in FIG. 9 are completed. All the widths of the Major and Minor of the servo patterns except patterns subjected to final operation become the same width as the read-in head.

Thereby, even the narrow width read-in element to be used in the shingle write can carry out the servo following with the same precision as in the conventional system. After the formation of the servo patterns, it is possible inspect the magnetic head or magnetic disc by writing or reading a data in a data region by the system for forming the servo patterns.

Consequently, it is possible to provide a device which can inspect a shingle write-type magnetic head or magnetic disc.

In the foregoing explanation, the case of the six patterns A-F has been described. The number of the patterns is not limited to six and may be the plural number which allows the servo following.

Moreover, in the foregoing explanation, when the servo pattern is formed, for example, after the A pattern is formed with the frequency fu, it is overwritten and erased with the frequency fe with two alternate D patterns. If the responseability of the write-in element and the read-in element is good or the pattern width can be widely taken, the B pattern after the A pattern may be overwritten and erased.

According to the embodiment of the present invention, it is possible to prepare the servo patterns corresponding to the magnetic head for a new type shingle write, by appropriation of the part, as it is, on which the conventional servo pattern is written, and addition of the step to overwrite and erase the part with another frequency, thus easily making it possible to shorten a development schedule and make version-up of the conventional device.

Moreover, the shingle write servo following system according to the embodiment of the present invention can be also applied to a magnetic recording device which employs the shingle write system carrying out the servo following. That is, in the same manner as in the inspection device for the magnetic head or the inspection device for the magnetic disc, after the shingle write-type servo pattern is written-in with the frequencies fu, fe, the shingle write-type data is written in the data region on the frequencies fu, fe. In this case, if the write-in width is triple as wide as the read-in width, data relative to a next cycle and a cycle subsequent to the next cycle are rewritten, so that the data are rewritten in the range without affecting, for example, per block unit. Moreover, the two frequencies for preparing the data may be changed to two frequencies for preparing the servo pattern.

What is claimed is:

1. A magnetic head inspection device or magnetic disc inspection device for measuring a property of a magnetic head or magnetic disc, the inspection device comprising:
    a write-in signal generation section configured to write a servo pattern into a servo pattern region of the magnetic disc, and configured to write data into a data region of the magnetic disc, by a write-in element of the magnetic head;
    a servo control section provided with:
        a servo pattern detection section configured to read-in the servo pattern written in the servo pattern region of the magnetic disc, by a read-in element of the magnetic disc, and
        a head detection/positioning section configured to carry out servo-following of a position of the magnetic head on the magnetic disc, on the basis of output of the servo pattern detection section; and
        a total control section configured to control the entire write-in signal generation section and servo control section;
    wherein the servo pattern comprises a plurality of patterns, and the write-in signal generation section is configured to write-in the patterns with a first frequency for causing the patterns to be subjected to the servo-following, and is configured to overwrite the patterns with a second frequency different from the first frequency, except a servo-following width which is used in the servo-following; and
    wherein the servo-following width is wider than the read-in element width, and is not more than 120% of the read-in element width.

2. The magnetic head inspection device or magnetic disc inspection device according to claim 1, wherein
    the width of the read-in element has a value in a range of 20%-50% of the width of the write-in element.

3. The magnetic head inspection device or magnetic disc inspection device according to claim 1, wherein
    the plurality of patterns are formed with deviation at predetermined intervals in radial and circumferential directions of the magnetic disc.

4. The magnetic head inspection device or magnetic disc inspection device according to claim 1, wherein
    the write-in signal generation section is configured to write-in the data with a third frequency for forming the data, and to prepare the data by overwriting the data with a fourth frequency different from the third frequency, except a formed data width.

5. The magnetic head inspection device or magnetic disc inspection device according to claim 4, wherein
    the third frequency corresponds to the first frequency, and the fourth frequency corresponds to the second frequency.

6. A magnetic head or magnetic disc inspection method for measuring a property of a magnetic head or magnetic disc, the method comprising the steps of:
    rotating the magnetic disc;
    writing a servo pattern into a servo pattern region of the magnetic disc, by a write-in element of the magnetic head; and
    reading-in the servo pattern written in the servo pattern region of the magnetic disc, by a read-in element of the magnetic head;
    servo-following a position of the magnetic head on the magnetic disc, on the basis of the servo pattern;
    wherein the servo pattern comprises a plurality of patterns, and the method includes the steps of: writing-in the patterns with a first frequency for causing the patterns to be subjected to the servo-following and, thereafter, overwriting the patterns with a second frequency different from the first frequency, except a servo-following width used in the servo-following;
    wherein the method includes the step of forming the plurality of patterns with deviation at predetermined intervals in radial and circumferential directions of the magnetic disc; and
    wherein the method includes the steps of: writing the first frequency into a position of an arbitrary pattern of the plurality of patterns, and writing the second frequency into a position of a different pattern, during the same one cycle of rotation.

7. The magnetic head or magnetic disc inspection method according to claim 6, wherein
    the method includes the steps of: writing the first frequency into a position of a pattern subsequent to the arbitrary pattern, and writing the second frequency into a position of a pattern subsequent to the different pattern, during one cycle of rotation subsequent to the one cycle of rotation.

8. The magnetic head or magnetic disc inspection method according to claim 6, wherein the servo-following width is wider than the read-in element width, and is not more than 120% of the read-in element width.

9. The magnetic head or magnetic disc inspection method according to claim 6, wherein
    the width of the read-in element has a value in a range of 20%-50% of the width of the write-in element.

10. A magnetic disc recording device, comprising:
    a write-in signal generation section configured to write a servo pattern into a servo pattern region of a magnetic disc, and configured to write data into a data region of the magnetic disc, by a write-in element of a magnetic head; and
    a servo control section, provided with: a servo pattern detection section configured to read-in the servo pattern written in the servo pattern region of the magnetic disc, by a read-in element of the magnetic disc, and a head detection/positioning section configured to servo-follow a position of the magnetic head on the magnetic disc;
    wherein the servo pattern comprises a plurality of patterns, and the write-in signal generation section is configured to write-in the patterns and the data on a first frequency for causing them to be subjected to the servo-following, is configured to overwrite the patterns and the data with a second frequency different from the first frequency, except a servo-following width of the portion written-in with the first frequency which is used in servo-following, and forms the pattern and the data; and wherein the servo-following width is wider than the read-in element width, and is not more than 120% of the read-in element width.

11. A magnetic disc recording method comprising the steps of:

rotating a magnetic disc;

writing a servo pattern, comprising a plurality of patterns, into a servo pattern region of the magnetic disc, and writing data into a data region of the magnetic disc, by a write-in element of a magnetic head;

reading-in the servo pattern written in the servo pattern region of the magnetic disc, by a read-in element of the magnetic head;

servo-following a position of the magnetic head on the magnetic disc based on the servo pattern; and reading-in the data, wherein the method includes the steps of: writing-in the patterns and the data with a first frequency for causing them to be subjected to the servo-following and, thereafter, overwriting a portion, written-in with the first frequency, on the patterns and the data with a second frequency different from the first frequency, except a servo-following width used in the servo-following;

wherein the method includes the step of forming the plurality of patterns with deviation at predetermined intervals in radial and circumferential directions of the magnetic disc; and wherein the method includes the steps of: writing the first frequency into a position of an arbitrary pattern of the plurality of patterns, and writing the second frequency into a position of a different pattern, during the same one cycle of rotation.

* * * * *